Figure 1:
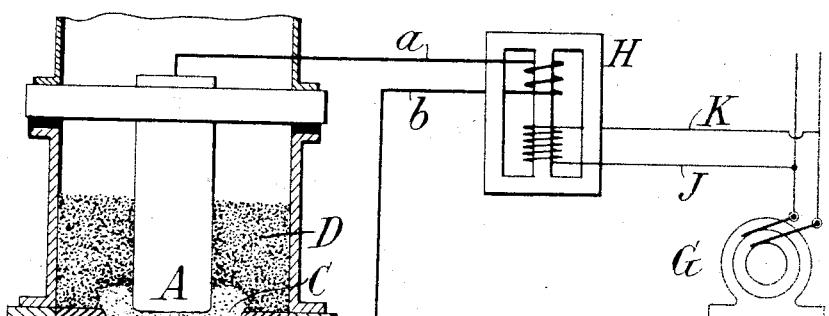
Figure 1:
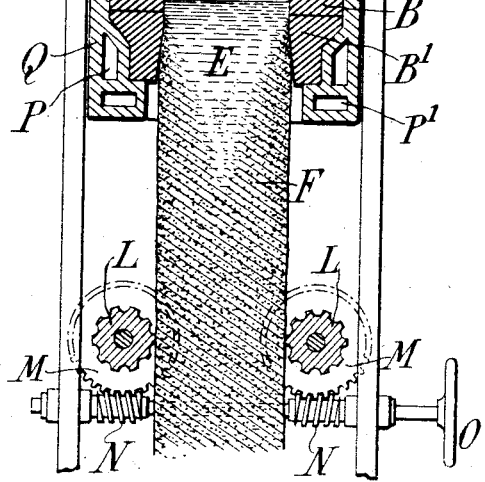
Figure 1:
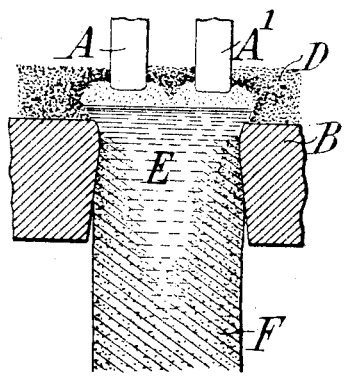
Figure 1:
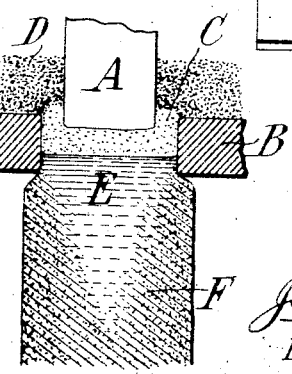

No. 872,351. PATENTED DEC. 3, 1907.
J. C. KING.
MANUFACTURE OF CALCIUM CARBID, &c.
APPLICATION FILED JAN. 5, 1904.

WITNESSES:
Rene Brune
Fred White

INVENTOR:
Jesse Critz King,
By Attorneys,
Arthur C. Fraser & Co.

UNITED STATES PATENT OFFICE.

JESSE CRITZ KING, OF ST. CATHARINES, ONTARIO, CANADA, ASSIGNOR TO THE WILLSON CARBIDE WORKS COMPANY OF ST. CATHARINES, LIMITED, OF ST. CATHARINES, CANADA, A CORPORATION OF ONTARIO.

MANUFACTURE OF CALCIUM CARBID, &c.

No. 872,351.     Specification of Letters Patent.     Patented Dec. 3, 1907.

Application filed January 5, 1904. Serial No. 187,836.

*To all whom it may concern:*

Be it known that I, JESSE CRITZ KING, a citizen of the United States, residing at St. Catharines, in the Province of Ontario, Canada, have invented certain new and useful Improvements in the Manufacture of Calcium Carbid, &c., of which the following is a specification.

One object of this invention is to produce calcium carbid (or the like) which is devoid, or substantially so, of crust.

Another object is to avoid, or reduce to a minimum, the necessity for rehandling or working over and over again the powdered mixture of lime and carbon, which in existing processes is taken from the furnace surrounding the pig or ingot of carbid.

In existing processes as applied for producing calcium carbid, the mixture of powdered lime and carbon is fed into and around the zone of fusion between or adjacent to the carbon terminals or pencils of the electric furnace, only the central portion of the material being fused and reduced, so that the pig of carbid is surrounded by a mass of the unreduced powdered mixture. The inner portion of the pig is practically pure carbid; but its outer portion consists of a crust which is composed wholly or chiefly of the unreduced mixture which by the heat has been so far fused as to form a dense hard layer. It is customary after the pig cools to chisel off this crust, which is ordinarily treated as a waste product, being unsalable except when some carbid is removed with it, and even then the gas content of the crust is ordinarily less than half that of pure carbid for a given weight. Commonly the crust is thrown away, since attempts to utilize it by regrinding and mixing with additional coke have not proved successful. The odor given out by the dump pile of crust makes it a serious public nuisance.

According to existing practice, for each ton of carbid produced, from two to four tons of the powdered mixture surrounding the pig has to be disposed of by being carried back, mixed with fresh material, and again fed to the furnace. The unreduced material comes from the furnace very hot; it is usually impracticable to cool it because this involves exposing it to the air, which results in burning out a large proportion of the carbon, and to avoid this loss the effort is made to keep the material from the air and to handle it as quickly as possible, and to return it quickly to the furnace. The inevitable loss of carbon by combustion in the material has to be restored by adding a proportion of fresh carbon. The handling of this hot material causes rapid deterioration of the elevating and conveying machinery. The losses and inconveniences entailed by the necessity of working over the unreduced material, constitute one of the most serious problems in the practical manufacture of calcium carbid.

Efforts have been made in Europe to produce a crustless carbid and avoid the necessity of rehandling unreduced material by tapping the liquid carbid from the furnace at intervals. As carbid solidifies at an extremely high temperature, it is very difficult to tap it. Before tapping the carbid it is necessary to force a heavy current through the mass to fuse and thoroughly liquefy the carbid, as otherwise it will not run or will chill in the tap hole. The purer the carbid the more difficult it is to liquefy it and successfully tap it; hence the common practice is to make a low-grade carbid by the tapping process. With this process the output per horse-power day is so much lower than that produced in ingot furnaces that the tapped carbid is more costly than the ingot carbid in proportion to its yield of gas, so that tapped carbid can not commercially compete with ingot carbid notwithstanding that the latter is subject to the losses hereinbefore pointed out incident to the removal and waste of its crust and the handling of hot unreduced mixture.

The process which I will proceed to describe produces a pig or ingot of carbid having no crust, the outer surface of the pig having substantially the same purity as its interior. This process also enables the discharge of hot unreduced mixture to be avoided either entirely or nearly so.

According to my invention,—instead of maintaining a zone of fusion within a mass of the mixture to be treated so as to be surrounded by an outer layer of this mixture, and so that in the final product an intervening crust is formed,—the zone of fusion is so confined or circumscribed within a wall of suitable refractory material, that the entire mixture is compelled to enter the zone of fusion so as to be completely reduced therein. The zone of fusion may extend above the circumscribing wall, but must extend within it, so that this wall (which for convenience I will designate a die) determines the outer boundary of at least the lower part of the zone of fusion, so that all of the powdered mixture which enters within this wall is fused and reduced. The fused material within the wall or die opening is supported on the pig or ingot of solidified carbid beneath. From time to time, or continuously, a feeding movement is effected whereby the carbid is lowered relatively to the die and zone of fusion. This movement results in the newly formed liquid carbid being carried away from the arc or zone of fusion, so that the powdered mixture above may descend into the zone of fusion, and being fused and reduced, may enter the die. As the fused carbid is fed below the zone of fusion it begins to cool, and when separated to a sufficient distance it congeals or solidifies upon its exterior, the solidification gradually extending inward as it descends, until it becomes solid throughout its mass. Thus the entire powdered mixture is fused by passing it in substantially continuous manner through the zone of fusion, from which it is discharged and solidifies into a pig, which, as its exterior has had no contact with powdered or unreduced mixture, is devoid of crust, or in other words, the pig of carbid is of the same purity and richness upon its exterior as it is throughout its interior. The die serves to limit the zone of fusion and insure that all material which enters it shall become fused and reduced, and separates the unreduced mixture above from the solidified carbid or pig beneath. The newly formed liquid carbid is confined within the die and upheld upon the pig of carbid beneath, which substantially closes the die and forms a movable bottom therefor.

To assist the cooling of the carbid the lower portion of the die may be artificially cooled, as by bringing it into proximity to a water-jacketed shell or casing of cast iron. To prevent adhesion between the partially cooled and plastic carbid and the die, the opening through the latter is preferably made tapering so as to enlarge downwardly. Hence the downward feed of the pig of carbid carries the congealing outer portion of the pig out of immediate contact with the die. The shape of the die determines the shape and cross-section of the pig and is itself determined or limited by the shape of the carbon pencil or pencils and the width of the zone of fusion around the pencil or pencils, this zone being of greater or less width according to the amount of electric energy that is expended in the furnace. For example in a continuous or double-pencil furnace expending six thousand amperes at twenty-five volts, the zone of fusion will extend about four inches outside the extreme outer dimensions of the pair of pencils. Hence in such case the opening in the die should not exceed the outline prescribed by this four-inch limit in order to insure the fusion and reduction of all the powdered mixture entering the die and thereby insure the production of a crustless pig of carbid. In a single-pencil furnace the die should constitute an electrode so that the arc shall pass between the pencil and die and thereby maintain the zone of fusion throughout the interspace. In such case the limit of size of opening in the die is determined by the length of arc or incandescent zone maintainable by the electromotive force applied. Inasmuch as there is some consumption or burning away of the carbon forming the die so that normally its opening would gradually enlarge, it is practically desirable to make the die in sections or segments by arranging bars or slabs of carbon in an approximately radial manner with their inner ends meeting to form within them the die opening, the slabs being longitudinally movable so that they may be fed forward from time to time to compensate for the consumption occurring at their inner ends.

The die must be made of or lined with a highly refractory material in order to withstand the intense heat. It may be electro-conductive or not, according to whether it forms one of the electrodes or not. In any case, however, carbon is the preferable material for the die, or at least for that portion thereof which is closely adjacent to the zone of fusion. Graphite is the preferable form of carbon, graphitized carbon being preferable for use as an electrode, the high resistance of molded graphite rendering it unsuitable. In any case, however, the lower part of the die is preferably of graphite, although firebrick or other material may be used.

My improved process may be practiced with various kinds or types of electric furnaces. For example, the furnace may have either a single or a double pencil; and the feed may be effected by raising the pencil or pencils and the die as the pig is built up, or by lowering the pig, leaving the pencils and die stationary.

To make the practical application of my invention clear to those skilled in the art, I will proceed to describe the same more in detail with reference to the accompanying drawings, which show essential portions of different types of electric furnaces.

Figure 1 is a vertical section of an upright single-pencil furnace having means for feeding the pig downwardly and showing the electric connections in diagram; Fig. 2 is a vertical section showing a construction of electrodes and die adaptable for such a furnace; Fig. 3 is a plan of the die of Fig. 2 showing the pencil in cross-section; Fig. 4 is a fragmentary vertical section showing a double pencil furnace; Fig. 5 is a similar section of a single pencil furnace showing a modified form of die.

In all the figures A designates a carbon pencil or electrode connected to one terminal of the circuit, and B designates the carbon die which may or may not be connected to the other terminal so as to constitute the other electrode. If not so connected a second pencil is provided as shown in Fig. 4, where A and A' are the respective pencils. The die may be built up of slabs, blocks or bricks of carbon in any suitable form, as for example as shown in Figs. 1 and 4, or preferably it is made up of a suitable number of bars or slabs of carbon arranged radially, the inner ends of the slabs abutting or nearly so to form between them the opening of the die as shown in Fig. 3. The inner face or opening of the die is preferably tapering so as to expand downwardly as shown in Figs. 1 and 4, which in the construction shown in Fig. 3 is readily accomplished by tilting the carbon slabs to an angle as shown in Fig. 2. The pencil A is of such size as to leave an annular space C between it and the die. It is through this annular space that the mixture or material D of lime and carbon is passed. This space within the die constitutes the zone of fusion. In this space the material is reduced and liquefied so that it forms a pool of molten carbid somewhat as shown at E, the carbid subsequently solidifying and forming a pig or ingot F.

The current is supplied from a generator G, which may be either a direct or alternating current generator, and be connected directly to the electrodes, that is, to the pencil A and die B, or the two pencils A A', as the case may be. Preferably however it is an alternating generator, and a transformer H of any suitable type is interposed. This should be a step-down transformer adapted to reduce a high voltage between the line conductors J K to a low voltage between the furnace conductors a b. It is preferable that the latter voltage be automatically varied by the transformer (or equivalently by an adjunct thereto in the form of a constant current regulating coil) so as to produce a substantially constant current in the secondary circuit irrespective of variations in the internal resistance of the furnace; but this forms no part of my invention.

The raw material which is reduced in the zone of fusion and forms a molten pool of carbid beneath takes the shape of the interior or opening in the die, and, being gradually lowered or fed downward as it recedes from the electric arc or zone of highest incandescence gradually solidifies, its solidification occurring first at its exterior in contact with the die where it is slightly cooled by the die, the latter being long or deep enough in proportion to the rate of movement and the intensity of the heat, to insure that the material shall harden on its exterior before in its downward movement it entirely clears the die. Thus adjacent to the lower part of the die the carbid has approximately the form of a shell of solidified material of greater or less thickness inclosing within it a body of molten carbid, and as the heat is gradually radiated from the latter the solidification progresses inwardly until the entire mass becomes a solid pig. Any suitable provision is made for lowering this pig, either by a slow continuous movement or by intermittent movements from time to time, this operation being performed either manually or automatically. As one example of a suitable means for lowering the pig, I have shown in Fig. 1 a pair of grooved rollers L L on the shafts of which are fixed worm wheels M M turned by worms N N on a shaft on which is fixed an operating wheel O which may be turned by hand or by any suitable mechanism. From time to time the cooler portion of the pig hanging below the feed rollers L L may be broken off.

To insure that the carbid shall be sufficiently hardened or solidified before it emerges from the bottom of the die, it preferable to provide a water-jacket P formed in a cast iron shell Q which surrounds and supports the die. By circulating water through this jacket the lower part of the die is rapidly cooled. Normally the pig or ingot should be sufficiently chilled to retain its form before emerging from the die, so that with the flaring die shown in Fig. 1 the ingot will be somewhat smaller than the lower mouth of the die. In some cases however the proportions may be such that with a given rate of feed the carbid may emerge from the die in plastic condition so as to expand before hardening, or the feed may be at such a rate that the liquid carbid is liberated beneath the bottom of the die and overflows, quickly becoming solidified upon the exterior of the pig, which latter in such case becomes of greater diameter than the die opening. Either of these conditions is indicated in Fig. 5. In any case it will be seen that it is a characteristic of my process that the material which enters the die is wholly fused and reduced in the arc or zone of fusion, and is shaped by contact with the die; hence only substantially pure carbid is discharged beneath the die, unaccompanied by any partially fused or partially reduced material, so that the pig of carbid is of substantially full purity and richness to its very exterior, and has no outer crust of unreduced material.

The pig in its progress below the die is preferably unaccompanied by any of the unreduced mixture, so that none of the latter requires to be elevated and re-fed to the furnace. In some cases, however, it may be found preferable to admit some of the unreduced mixture around the pig beneath the die, for example as a means of protecting the surrounding parts from injury by the too rapid radiation of heat from the pig. In such case, however, it is preferable to employ for this purpose some other highly refractory material, such for example as coarsely comminuted coke. However it is to be understood that while my invention permits of wholly avoiding the reworking of unreduced mixture descending around the pig, yet my invention will not be avoided by the admission of unreduced mixture to the space around the newly formed pig; such admission will not form the crust which it is the object of my invention to avoid, since when the carbid has cooled sufficiently to solidify, it is no longer hot enough to fuse the powdered mixture or the lime therein so as to form a crust. Such fusion and crusting can occur only in proximity to the zone of fusion where the carbid is liquefied, and where the temperature is above the fusing point of lime.

When the die B forms one of the electrodes, its upper part should be of conductive carbon (amorphous or graphitized), but its lower part may be of molded graphite or even of firebrick. In Fig. 1 the die is shown as divided into an upper part B of carbon and a lower part B' of graphite or firebrick. Even cast iron if suitably cooled by a water-jacket may serve as the lower portion of the die, if sufficiently removed from the zone of fusion. Thus the lower water-jacket P' in Fig. 1 may serve as the lower part of the die.

My invention does not exclude the employment of a pencil which projects to some extent down within the die opening, as shown for example in Fig. 5, thereby leaving an annular space between, across which the arc passes and through which the material is fed; this feature, however, forms no part of my invention.

My invention permits of the use of limestone instead of lime, which heretofore has been impracticable in an ingot furnace on account of the hardness and density of the crust formed when limestone was used.

My invention enables the mixed raw materials (lime or limestone and coke or other form of carbon) to be used in coarser form than has heretofore been feasible in an ingot furnace. Instead of these materials being finely ground or pulverized and intimately commingled, they need only be coarsely broken or comminuted and mixed together, thereby avoiding considerable expense. Heretofore the use of coarse lumps has been impracticable because the fusing of the lime would cause it to extend outward through the comparatively large interstices between the carbon lumps and form a crust of excessive thickness, a result which is avoided in my process.

My invention is not limited strictly to the production of calcium carbid, since it is applicable to the production of any other substance by electric smelting or reduction which has similar properties, that is, which if produced by smelting fusion or reduction within a mass of the raw material, results in the formation of a crust of fused and unreduced or only partly reduced raw material around the mass of completely reduced product.

My invention may be greatly varied or modified in its application to varying types or kinds of electric furnaces, without departing from its essential features or characteristics.

I claim as my invention:—

1. The production of calcium carbid by fusing and reducing the entire mixture by passing it through a zone of fusion and discharging the reduced product therefrom as a pig, so that the pig is devoid of crust.

2. The production of calcium carbid by fusing and reducing the mixture and confining the fused reduced material within walls in contact therewith, while supporting it by the solidified product beneath.

3. The production of calcium carbid by fusing and reducing the entire mixture by passing it through a zone of fusion, the fused reduced material being maintained within and bounded by a die opening, and discharging the solidifying carbid therefrom as a pig, so that the pig is devoid of crust.

4. The production of calcium carbid by passing the mixture through a zone of fusion wherein it is reduced and through a die which separates the unreduced mixture above from the solidified carbid beneath so as to form a crustless carbid.

5. The production of calcium carbid by passing the entire mixture through a zone of fusion wherein it is reduced and through a die in which the carbid hardens sufficiently to determine the shape of the pig.

6. The production of calcium carbid by fusing and reducing the mixture while confining the fused reduced material within walls in contact therewith, supporting the fused reduced material on the solidified carbid beneath, and discharging the solidifying carbid therefrom as a pig, the pig being exposed beneath the furnace outlet to cool it.

7. The production of calcium carbid by fusing and reducing the entire mixture by passing it progressively through a zone of fusion, and discharging the molten carbid therefrom into a molten mass of carbid maintained adjacent to the zone of fusion, and progressively displacing the product beyond said zone so that it may harden into a pig of crustless carbid.

8. Electric reduction by passing the raw material and reducing agent through a zone of fusion and reduction maintained by a suitable current between electrodes, while the material is confined within walls so as to fuse and reduce the entire material within such walls, and progressively discharging the fused and reduced material therefrom while confining it until it solidifies, whereby it is discharged as a pig.

In witness whereof, I have hereunto signed my name in the presence of two subscribing witnesses.

JESSE CRITZ KING.

Witnesses:
 ARTHUR C. FRASER,
 FRED WHITE.